United States Patent [19]
Nie

[11] Patent Number: 5,823,508
[45] Date of Patent: Oct. 20, 1998

[54] ONE PIECE QUICK CONNECT

[75] Inventor: Tao Nie, Macomb Township, Mich.

[73] Assignee: ITT Automotive, Inc., Auburn Hills, Mich.

[21] Appl. No.: 771,429

[22] Filed: Dec. 20, 1996

[51] Int. Cl.⁶ .................................................. F16L 37/28
[52] U.S. Cl. .................................. 251/149.6; 277/207 A; 285/319
[58] Field of Search ...................... 251/149.6; 277/207 A, 277/165, 188 A; 285/319, 379, 348, 351

[56] References Cited

U.S. PATENT DOCUMENTS

| | | | |
|---|---|---|---|
| 4,905,964 | 3/1990 | Shiozaki | 285/319 |
| 5,067,754 | 11/1991 | Bartholomew | 285/319 |
| 5,161,834 | 11/1992 | Norkey | 285/319 |
| 5,193,857 | 3/1993 | Kitamura | 285/319 |
| 5,213,376 | 5/1993 | Szabo . | |
| 5,277,402 | 1/1994 | Szabo . | |
| 5,324,082 | 6/1994 | McNaughton | 285/319 |
| 5,378,025 | 1/1995 | Szabo . | |
| 5,383,087 | 1/1995 | Noone et al. . | |
| 5,466,017 | 11/1995 | Szabo et al. . | |
| 5,472,016 | 12/1995 | Szabo . | |
| 5,482,076 | 1/1996 | Taylor | 277/207 A |
| 5,524,673 | 6/1996 | Noone et al. . | |
| 5,542,716 | 8/1996 | Szabo et al. . | |
| 5,566,720 | 10/1996 | Cheney et al. . | |

FOREIGN PATENT DOCUMENTS

| | | |
|---|---|---|
| 9321466 | 10/1993 | WIPO . |
| 9325835 | 12/1993 | WIPO . |
| 9613680 | 5/1996 | WIPO . |
| 9621820 | 7/1996 | WIPO . |

Primary Examiner—Denise L. Ferensic
Assistant Examiner—Ramyar Farid
Attorney, Agent, or Firm—Thomas N. Twomey; J. Gordon Lewis

[57] ABSTRACT

A quick connect coupling connects a first fluid conduit to a second fluid conduit. The quick connect coupling includes a first single or multi-layer tube which is either metal or plastic and has a wall expanded radially outwardly adjacent a longitudinal end to define an integrally formed female portion of the coupling. The expanded end has at least two apertures extending through the wall adjacent the longitudinal end of the tube. A second tube which is either metal or plastic and has a first end with a radially outwardly projecting annular flange spaced longitudinally from the first end. The first end and the annular flange are engageable within the expanded end of the first tube. The first end of the second tube defines the male portion of the coupling. An elongated housing member has an outer periphery engageable within the expanded end of the first tube and has an aperture extending longitudinally therethrough for fluid communication between the first and second tubes. The housing member has an enlarged inner diameter for receiving the first end of the second tube therein. Sealing members are carried by the housing member and are insertable within the expanded end of the first tube with the elongated housing member. A lock member holds the elongated housing member in place within the expanded end of the first tube and operably engages with the apertures formed through the wall of the expand end of the first tube and the outwardly protruding annular flange of the second tube. An optional internal check valve can be provided within the elongated housing member.

25 Claims, 2 Drawing Sheets

ONE PIECE QUICK CONNECT

RELATED APPLICATIONS

This patent application is related to U.S. patent application Ser. No. 08/639,421 filed on Apr. 29, 1996 for a "Multi-layer Tubing Having Electrostatic Dissipation for Handling Hydrocarbon Fluids", and U.S. Ser. No. 08/329,900 filed on Oct. 27, 1994 for a "Multi-layer Fuel and Vapor Tube", and U.S. patent application Ser. Nos. 07/897,302, 07/897,376 and 07/897,304 all filed on Jun. 11, 1992 for "Multi-layer Fuel and Vapor Tube", and U.S. patent application Ser. No. 07/868,754 filed on Apr. 14, 1992 for "Multi-layer Fuel and Vapor Tube".

FIELD OF THE INVENTION

The present invention relates to quick connect couplings for tubular conduit having one or more layers of material defining the wall of the tube of the type employed in fluid conduit systems to facilitate assembly and disassembly of the male and female portions of the couplings.

BACKGROUND OF THE INVENTION

Quick connectors have been found to be useful in a wide range of applications and are frequently employed for joining fluid carrying conduits in automotive and industrial applications. Quick connectors typically are capable of being connected to one another with a single uniaxial movement. The ease of connection facilitates automated assembly and has resulted in quick connectors gaining general acceptance throughout the industry. Quick connectors typically employ simple constructions that are relatively inexpensive to manufacture. Quick connect fittings require an effective seal for handling volatile or hazardous fluids while permitting easy disassembly and reassembly during repair. Therefore, it is desirable in fluid-handling conduit to ensure that the connectors are properly coupled together in order to form an effective seal. A faulty coupling of male and female portions enables lead paths to form in the fluid conduit system. This can be particularly disadvantageous when the system is under pressure and the leaking connector expels pressurized fluid. Typically, male and female connectors are held together by friction locking configurations, where the male portion is manually insertable within the female portion to establish a fluid connection therebetween and the friction engaging surface, or a separate seal assembly, is provided to seal the male and female coupling portions with respect to one another.

With the increased use of single layer and multi-layer plastic tubing, it has become increasingly difficult to obtain an effective seal between the male and female portions. In addition, it has become increasingly difficult to obtain a friction fit coupling of the male and female members with respect to one another when using a single layer plastic or multi-layer plastic tube with low friction material in the fluid system without resorting to the use of additional mechanical clamping members.

SUMMARY OF THE INVENTION

The present invention provides a quick connect coupling for connecting a first fluid conduit to a second fluid conduit. The quick connect coupling according to the present invention includes a first tube, which is either metal or plastic, and has a wall made of at least one material layer, where a longitudinal end of the tube is expanded radially to define an integrally formed female portion of the coupling. The expanded longitudinal end of the tube includes at least two apertures extending through the wall adjacent to the longitudinal end of the tube. A second tube, which is either metal or plastic according to the present invention, has a first end with a radially outwardly protruding annular flange spaced longitudinally from the first end to define the male portion of the coupling. The first end and the annular flange of the second tube are engageable within the expanded end of the first tube. Seal means is provided for sealing an outer surface of the second tube with respect to an inner surface of the first tube, where the seal means is insertable within the expanded end of the first tube.

In the preferred embodiment, the seal means includes an elongated housing member having an outer periphery engageable within the expanded end of the first tube and includes an aperture extending longitudinally therethrough for fluid communication between the first and second tubes. The housing member has an enlarged inner diameter for receiving the first end of the second tube therein. The seal means preferably includes at least one inner seal interposed between the aperture of the housing member and the outer periphery of the second tube. The seal means preferably also includes at least one outer seal interposed between the outer periphery of the housing member and an inner surface of the expanded end of the first tube. Preferably, the outer seal is longitudinally spaced from the inner seal to maintain a reduced overall diameter of the housing member. The overall outer dimension of the housing member directly correlates to the degree of expansion required for the longitudinal end of the first tube and the thinning of the wall associated with the expansion of the longitudinal end. Preferably, two or more apertures are formed in the wall of the expanded end and have curved configurations, such as a circular or an oval shape to eliminate any sharp corners. The elimination of sharp corners in the apertures through the thinned wall of the expanded end prevents any tearing of the wall that may propagate from a sharp corner configuration and increases the coupling strength. Lock means preferably is provided for holding the elongated housing member in place within the expanded end of the first tube, where the lock means is engageable with the aperture formed through the wall of the expanded end of the first tube. The lock means also preferably is engageable with the annular flange of the second tube to hold the assembled male and female portions of the quick connect coupling with respect to one another until released. An optional configuration of the present invention includes valve means engageable within the elongated housing member. The valve means is moveable from a closed position to an open position in response to engagement with the first end of the second tube, when the second tube is inserted within the aperture formed in the housing member after the housing member has been inserted within the expanded end of the first tube. Biasing means normally urges the valve means toward the closed position when not engaged by the second tube.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
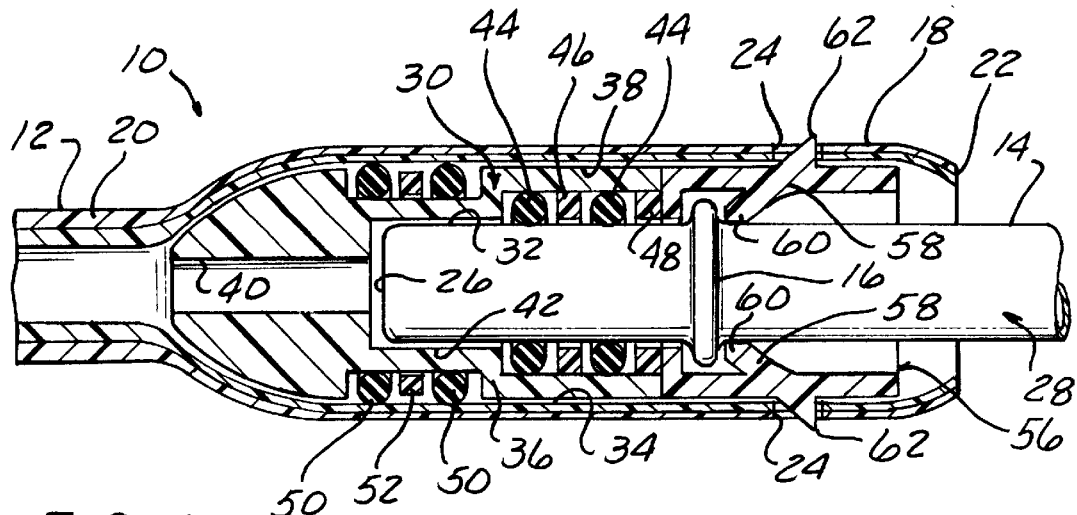
FIG. 1 is a cross sectional view of a quick connect coupling according to the present invention.

A quick connect coupling 10 according to the present invention is used for connecting a first fluid conduit 12 to a second fluid conduit 14. The first and second fluid conduits 12 and 14 can be formed of similar material compositions, or of different material compositions. For example, the second fluid conduit 14 can be formed of metal material and impacted to form a radially outwardly protruding annular flange 16 adjacent one end, or in the alternative can be injection molded of a plastic material with the annular flange 16 integrally formed thereon. The first fluid conduit 12 can also be formed of metal material having an integral expanded end 18, or the first fluid conduit 12 can be formed of plastic material with one or more layers, where an expanded end 18 can be integrally formed on a longitudinal end of the single or multi-layer plastic tube. While the present invention can be used with either metal or plastic conduit 12, the present invention is particularly well adapted for use in connecting multi-layer tubing or conduit 12, and in particular where the inside layer of the tube has low friction characteristics, such as various fluoropolymeric materials which are widely used in fuel lines in the automotive industries to limit the gasoline permeation through the plastic wall or walls of the tubing. By way of example, and not limitation, various tubing constructions suitable for use with the present invention are disclosed in U.S. Pat. No. 5,383,087 issued Jan. 17, 1995; U.S. Pat. No. 5,566,720 issued Oct. 22, 1996; International Publication No. WO 96/13680 published on May 9, 1996; International Publication No. WO 93/21466 published on Oct. 28, 1993; International Publication No. WO 93/25835 published on Dec. 23, 1993; and International Publication No. WO 96/21820 published on Jul. 18, 1996, each of which is incorporated by reference herein in its entirety.

The first fluid conduit or elongated tube 12 has a wall 20 made of at least one material layer, and preferably defines a multi-layer tube. The tube 12 is expanded radially adjacent a longitudinal end 22 to define an expanded end or female portion 18 of the coupling 10. The expanded end 18 has at least two apertures 24 extending through the wall 20 adjacent the longitudinal end 22 of the tube 12. When the integrally formed longitudinal end 22 of the first tube 12 is expanded, the wall 20 of the tube is thinned to a degree corresponding to the amount of expansion. In the present invention, it is desirable to minimize the radial expansion of the longitudinal end 22 of the first tube 12 in order to ensure that sufficient wall thickness 20 remains to provide the structural integrity of the female portion 18 of the coupling 10. In addition, it is desirable in the present invention to form two or more apertures 24 formed through the wall 20 spaced from the longitudinal end 22 of the first tube 12 with a curved shape, and preferably a round shape, to prevent high stress areas that can form in sharp corners resulting in failure of the integrity of the wall 20 adjacent the aperture 24.

The second fluid conduit or second tube 14 has a first end 26 with a radially outwardly projecting annular flange 16 spaced longitudinally from the first end 26 defining the male portion 28 of the coupling 10. The first end 26 and the annular flange 16 of the second tube 14 are engageable within the expanded end or female portion 18 of the first tube 12.

Seal means 30 seals an outer surface 32 of the second tube 14 with respect to an inner surface 34 of the first tube 12. The seal means 30 is insertable within the expanded end 18 of the first tube 12. Preferably, the seal means 30 includes an elongated housing member 36 having an outer periphery 38 engageable within the expanded end 18 of the first tube 12. The housing member 36 includes an aperture 40 extending longitudinally therethrough for fluid communication between the first and second tubes, 12 and 14 respectively. The housing member 36 has an enlarged inner diameter 42 adjacent one end for receiving the first end 26 of the second tube 14. At least one inner seal 44 is interposed between the enlarged inner diameter portion 42 of the aperture 40 and the outer surface 32 of the second tube 14. If first and second inner seals 44 are provided, preferably an inner annular spacer 46 is interposed between the first and second seals 44. A retainer 48 is connectable within the enlarged inner diameter portion 42 of the aperture 40 for retaining the seal member 44 in position within the enlarged inner diameter 42 of the housing member 36.

Figure 2:
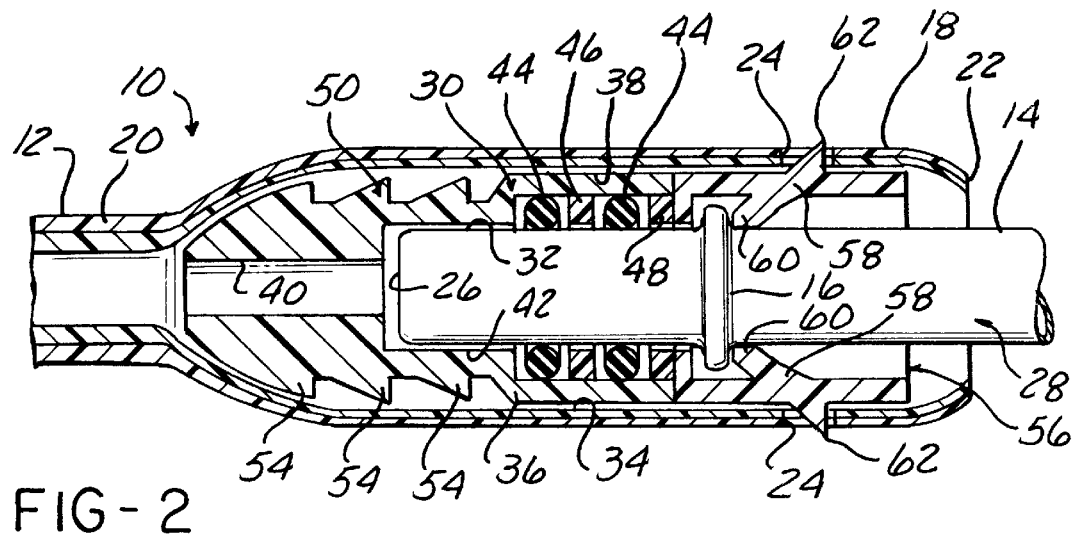
FIG. 2 is a cross sectional view of a first alternative configuration of the quick connect coupling according to the present invention.
Figure 3:
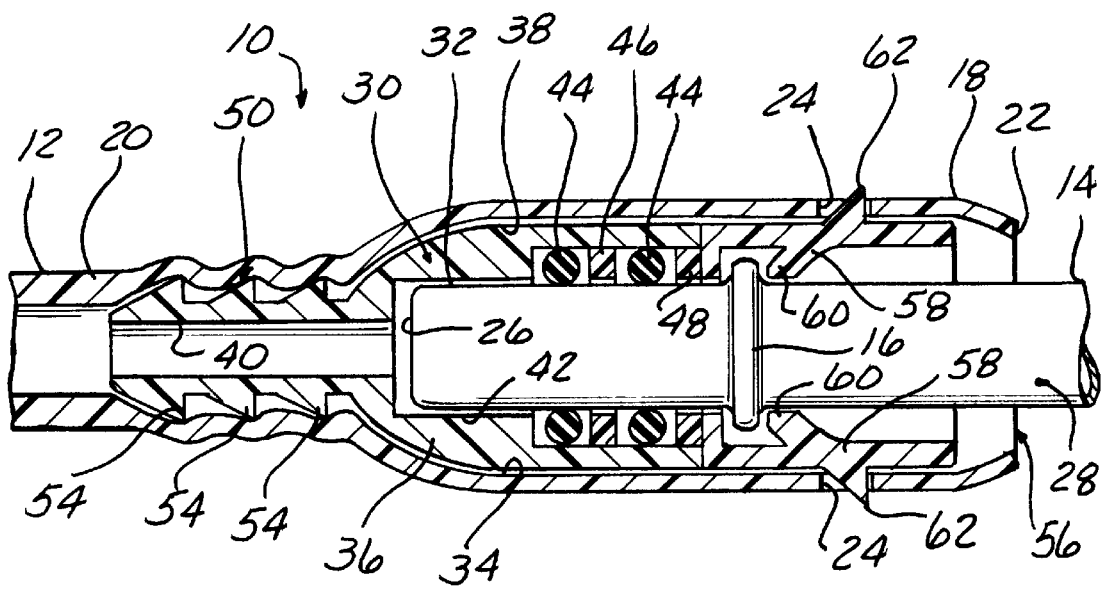
FIG. 3 is a cross sectional view of a second alternative configuration of the quick connect coupling according to the present invention.

The seal means 30 can also include at least one outer seal 50 interposed between the outer periphery 38 of the housing member 36 and the inner surface 34 of the first tube 12. If first and second outer seals 50 are provided, preferably an outer annular spacer 52 is interposed between the first and second outer seals 50. In an alternative configuration illustrated in FIGS. 2 and 3, the seal means 30 can include at least one outer seal 50 in the form of a plurality of outwardly, radially extending, annular barbs 54 formed on the elongated housing member 36 adjacent one end for sealing engagement with the inner surface 34 of the expanded end 18 of the first tube 12. Preferably, the inner seal 44 and outer seal 50 are spaced longitudinally with respect to one another along the elongated housing 36 to minimize the radial dimension of the seal means 30.

Lock means 56 holds the seal means 30 in place within the expanded end 18 integrally formed on the first tube 12. The lock means 56 is engageable with two or more apertures 24 formed through the wall 20 spaced from the longitudinal end 22 of the first tube 12 defining the female portion 18 of the coupling 10. The lock means 56 holds the second tube 14 in place after insertion within the expanded end 18 of the first tube 12. The lock means is engageable with the annular flange 16 of the second tube 14. Preferably, the lock means 56 is engageable within the expanded end 18 of the first tube 12 and is interposed between the first tube 12 and the second tube 14. The lock means preferably includes at least two radially extending levers 58 having a first end 60 engageable with the annular flange 16 of the second tube 14 for holding the second tube 14 in an inserted position in cooperation with a second end 62 of the lever 58 engageable with the aperture 24 formed in the wall 20 of the expanded end 18 of the first tube 12. This configuration provides a mechanical interconnection between the locking means 56 and the integrally formed female portion 18 of the first tube 12 and with respect to the annular flange 16 formed on the second tube 14. It is believed that this configuration should eliminate the need for additional mechanical clamping bands to hold single or multi-layer plastic tubes with respect to the coupling member as currently used in the industry.

Figure 4:
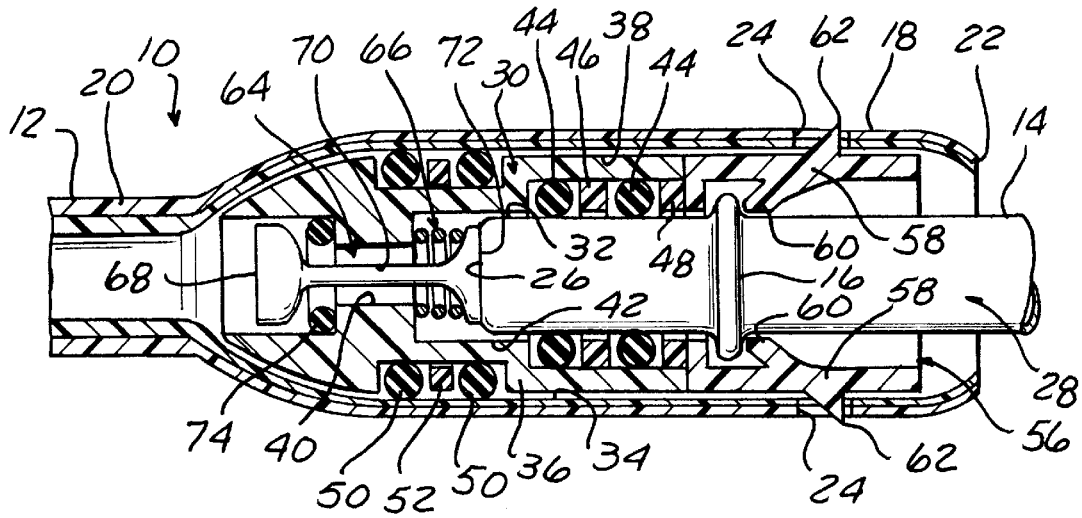
FIG. 4 is a cross sectional view of a third alternative configuration for a quick connect coupling according to the present invention including an internally disposed check valve.
Figure 5:
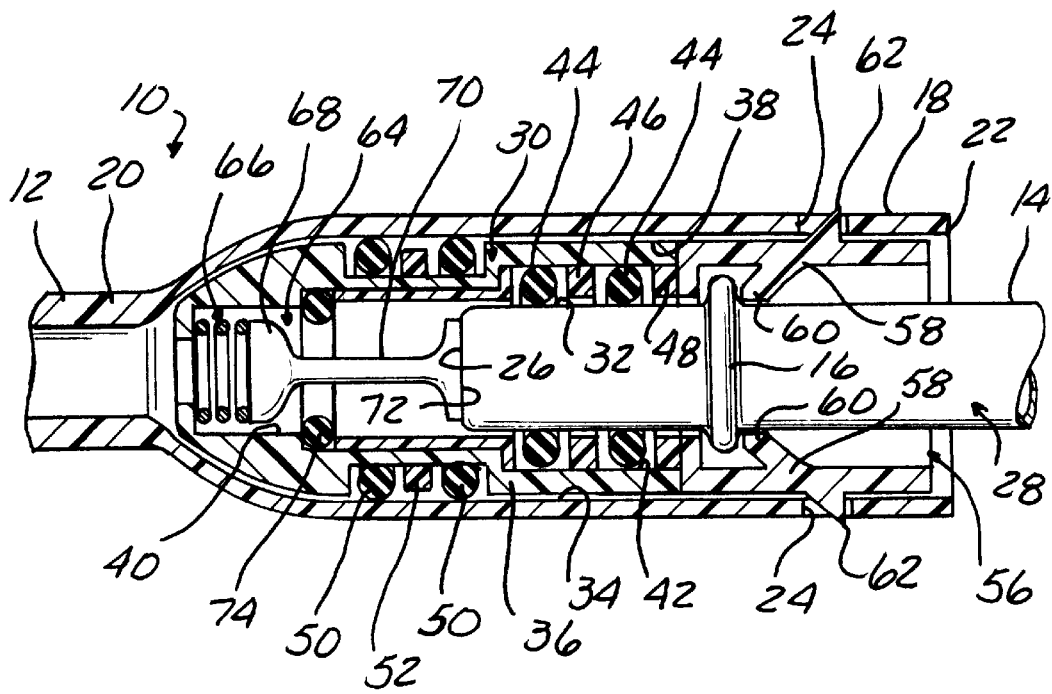
FIG. 5 is a cross sectional view of a fourth alternative configuration for a quick connect coupling according to the present invention including an internally disposed check valve.

Referring now to FIGS. 4 and 5, an optional valve means 64 can be provided. The valve means 64 can be insertable within the expanded end 18 of the first tube 12 and is movable from a closed position (not shown) to an open position as shown in FIGS. 4 and 5 in response to engagement with the first end 26 of the second tube 14. Biasing means 66 normally urges the valve means 64 toward the closed position. The valve means 64 can include and elongated member having a bell or cup shaped end 68 connected by a reduced diameter portion 70 to a generally flat or planar end 72 defining a generally T-shaped configuration when viewed in combination with the reduced diameter portion 70. The reduced diameter portion and the planar end 72 allow fluid to flow through the aperture 40 of the housing member 36 into the first end 26 of the second tube 14. When the second tube 14 is not inserted within the female aperture 18 of the first tube 12, the biasing means 66 normally urges the cup shaped end 68 of the valve means 64 into sealing engagement with an annular seal 74 defining the valve seat. As the first end 26 of the second tube 14 is inserted within the enlarged inner diameter 42 of the housing member 36, the first end 26 engages the planar end 72 of the valve means 64, compressing the biasing means 66, and moving the cup shaped end 68 away from the seal 74 defining the valve seat allowing fluid communication between the first conduit 12 and the second conduit 14.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. In a quick connect coupling for connecting a first fluid conduit to a second fluid conduit, said second fluid conduit having a first end with a radially outwardly protruding annular flange spaced longitudinally from said first end defining an integral male portion of said coupling, an elongate housing having an outer periphery and an aperture extending longitudinally therethrough for fluid communication between said first and second conduits, said housing having an enlarged inner diameter for receiving said first end of said second conduit therein, lock means engageable with said annular flange of said second conduit for holding said second conduit in place, the improvement comprising:

said first fluid conduit made of an expandable material and having a wall made of at least one material layer initially defining a first diameter and having a first wall thickness adjacent a longitudinal end, said longitudinal end of said first conduit expanded radially creating a second diameter greater than said first diameter and a second wall thickness less than said first wall thickness, said expanded end of said first conduit defining an integral, non-separable, unitary female portion of said coupling formed directly from said first conduit and having at least one aperture extending through said wall adjacent said longitudinal end of said first conduit;

said housing insertible within said expanded end of said first conduit;

said lock means insertible within said expanded end of said first conduit and cooperatively engageable with said at least one aperture formed in said wall of said first conduit for holding said housing in place within said first conduit; and said annular flange and first end of said second conduit engageable within said housing in said expanded end of said first conduit while passing through said lock means, such that said lock means is engageable with said flange of said second conduit for holding said second conduit in place with respect to said first conduit after insertion within said housing.

2. The quick connect coupling of claim 1 further comprising:

means for sealing an outer surface of said second conduit with respect to an inner surface of said first conduit, said sealing means insertible within said expanded end of said first conduit, wherein said seal means includes at least one inner seal interposed between said aperture of said housing and an outer surface of said second conduit.

3. The quick connect coupling of claim 2 further comprising:

a retainer connectible within the aperture extending longitudinally through the housing for fluid communication between said first and second conduits for retaining the at least one inner seal member in position within the aperture.

4. The quick connect coupling of claim 2 wherein said at least one inner seal includes a first inner seal and a second inner seal spaced longitudinally from one another and an inner annular spacer interposed between said first and second seals.

5. The quick connect coupling of claim 2 further comprising:

said seal means including at least one outer seal interposed between said outer periphery of said housing and an inner surface of said expanded end of said first conduit.

6. The quick connect coupling of claim 5 wherein said at least one outer seal includes a first outer seal and a second outer seal spaced longitudinally from one another and an outer annular spacer interposed between said first and second outer seals.

7. The quick connect coupling of claim 5 wherein said at least one outer seal includes a plurality of outwardly, radially extending, barbs formed on the housing for sealing engagement with said inner periphery of said expanded end of said first conduit.

8. The quick connect coupling of claim 5 wherein said at least one inner seal and said at least one outer seal are spaced longitudinally from one another along said housing.

9. The quick connect coupling of claim 1 wherein said lock means includes at least one radially extending lever having a first end engageable with said annular flange of said second conduit for holding said second conduit in an inserted position in cooperation with a second end of said lever engageable with said at least one aperture formed in said wall of said expanded end of said first conduit.

10. The quick connect coupling of claim 1 further comprising:

valve means insertible within said expanded end of said first conduit and moveable from a closed position to an open position in response to engagement with said first end of said second conduit when inserted within said expanded end of said first conduit; and biasing means for urging said valve means normally toward said closed position.

11. The quick connect coupling of claim 1 wherein said expandable material of said first conduit is a metal material.

12. The quick connect coupling of claim 1 wherein said expandable material of said first conduit is a plastic material where the wall is made of at least one layer.

13. The quick connect coupling of claim 1 wherein the second conduit is made of a metal material.

14. The quick connect coupling of claim 1 wherein the second conduit is made of a plastic material where a wall is made of at least one layer.

15. The quick connect coupling of claim 1 further comprising:

said first fluid conduit made of an expandable multi-layer material.

16. The quick connect coupling of claim 15 further comprising:

means for sealing said second conduit with respect to said first conduit, said sealing means associated with said housing and insertible within said expanded end of said first conduit with said housing, wherein said seal means includes at least one inner seal interposed between said aperture of said housing and an outer surface of said second conduit.

17. The quick connect coupling of claim 16 further comprising:

a retainer connectible within the aperture extending longitudinally through the housing for fluid communication between said first and second conduits for retaining the at least one inner seal member in position within the aperture.

18. The quick connect coupling of claim 16 wherein said at least one inner seal includes a first inner seal and a second inner seal spaced longitudinally from one another, and an inner annular spacer interposed between said first and second seals.

19. The quick connect coupling of claim 16 further comprising:

said seal means including at least one outer seal interposed between said outer periphery of said housing and an inner surface of said expanded end of said first conduit.

20. The quick connect coupling of claim 19 wherein said at least one outer seal includes a first outer seal and a second outer seal spaced longitudinally from one another and an outer annular spacer interposed between said first and second outer seals.

21. The quick connect coupling of claim 19 wherein said at least one outer seal includes a plurality of outwardly, radially extending, barbs formed on the housing for sealing engagement with said inner periphery of said expanded end of said first conduit.

22. The quick connect coupling of claim 19 wherein said at least one inner seal and said at least one outer seal are spaced longitudinally from one another along said housing.

23. The quick connect coupling of claim 15 wherein said lock means includes at least one radially extending lever having a first end engageable with said annular flange of said second conduit for holding said second conduit in an inserted position in cooperation with a second end of said lever engageable with said at least two apertures formed in said wall of said expanded end of said first conduit.

24. The quick connect coupling of claim 15 further comprising:

valve means engageable with said housing and insertible within said expanded end of said first conduit with said housing, said valve means moveable from a closed position to an open position in response to engagement with said first end of said second conduit when said second conduit is inserted within said aperture formed in said housing inserted within said expanded end of said first conduit; and biasing means for urging said valve means toward said closed position.

25. The quick connect coupling of claim 1 further comprising:

said expanded end having at least two apertures extending through said wall adjacent said longitudinal end of said first conduit.

\* \* \* \* \*